(12) United States Patent
Gibbs

(10) Patent No.: US 6,766,912 B1
(45) Date of Patent: *Jul. 27, 2004

(54) SECURED RECEPTACLE HOLDER

(76) Inventor: Dorian Gibbs, 5253 San Vidente Blvd., Los Angeles, CA (US) 90019

( * ) Notice: Subject to any disclaimer, the term of this patent is extended or adjusted under 35 U.S.C. 154(b) by 0 days.

This patent is subject to a terminal disclaimer.

(21) Appl. No.: 09/200,634

(22) Filed: Nov. 30, 1998

Related U.S. Application Data

(63) Continuation-in-part of application No. 08/745,371, filed on Nov. 8, 1996, now Pat. No. 5,842,671.

(51) Int. Cl.[7] .............................................. A47B 73/00
(52) U.S. Cl. ...................... 211/74; 211/78; 248/231.41; 248/311.2
(58) Field of Search .......................... 248/311.2, 228.3, 248/231.41, 146, 154, 103, 229.25, 231.71, 228.6; 211/78, 11, 74; D6/403, 457

(56) References Cited

U.S. PATENT DOCUMENTS

| | | | | |
|---|---|---|---|---|
| 696,790 A | * | 4/1902 | Atkinson ..................... 206/541 |
| 887,282 A | * | 5/1908 | Smith .......................... 211/121 |
| 1,013,015 A | * | 12/1911 | Herman ....................... 211/121 |
| 1,166,200 A | * | 12/1915 | Fretwell ................. 248/160 X |
| 1,284,010 A | * | 11/1918 | Wilbur ........................ 248/103 |
| 1,315,621 A | * | 9/1919 | Barlow ........................ 248/103 |
| 1,550,588 A | | 8/1925 | Soldani |
| 1,688,765 A | * | 10/1928 | Veras .......................... 248/103 |
| 2,532,244 A | | 11/1950 | Pasmore |
| D162,959 S | | 4/1951 | Janes et al. |
| 2,683,640 A | * | 7/1954 | Mangine ............... 248/311.2 X |
| 2,784,261 A | * | 3/1957 | Anklesaria ................... 179/148 |
| 3,021,106 A | | 2/1962 | Kramer |
| 3,036,717 A | | 5/1962 | Johnson |
| 3,194,403 A | * | 7/1965 | Van Horn, Jr. ................ 211/78 |
| 3,239,181 A | | 3/1966 | Ellerbrock |
| 3,317,171 A | | 5/1967 | Kramer |
| 3,498,471 A | * | 3/1970 | Dirkx .......................... 211/131 |
| 3,508,732 A | * | 4/1970 | Trachtenberg et al. .................... 248/311.2 X |
| 3,528,591 A | * | 9/1970 | Von Herbulis ........... 224/42.46 |
| 3,618,642 A | * | 11/1971 | Beaulieu ...................... 141/174 |
| D225,437 S | * | 12/1972 | Killigrew, Jr. ....... 248/311.2 X |
| D226,623 S | | 4/1973 | Shuford |

(List continued on next page.)

Primary Examiner—Daniel P. Stodola
Assistant Examiner—Khoa Tran
(74) Attorney, Agent, or Firm—Knobbe, Martens, Olson & Bear, LLP.

(57) ABSTRACT

A secured receptacle holder having two-securing posts each with a clamping member and rib configuration. The posts are connected by a clamping screw that rotates clockwise to attach and counter clockwise to detach by a compression knob. Continued rotation clockwise causes the lower post to telescope into the main post while driving the clamping members toward one another. On other types of surfaces support is achieved by a pedestal base. The main post top has a rotator ring attached at its top end. One of the holders may include a support member, base support and support walls. The support walls and the base support are connected for holding the receptacles. Advantageously, one or more of the holders may be configured to hold one or more items or receptacles and the holders may have various sizes and configurations depending upon the number and type of items to be held or supported.

6 Claims, 14 Drawing Sheets

U.S. PATENT DOCUMENTS

| | | | | |
|---|---|---|---|---|
| 3,734,439 A | | 5/1973 | Wintz | |
| 3,807,600 A | * | 4/1974 | Moss et al. | 221/11 |
| 3,913,778 A | * | 10/1975 | Oglesbee | 220/23.83 |
| 3,913,878 A | * | 10/1975 | Wayne | 248/311.2 X |
| 3,966,102 A | * | 6/1976 | Clark | 248/311.2 X |
| 3,980,264 A | * | 9/1976 | Tomasik | 248/311.2 X |
| 3,987,993 A | * | 10/1976 | Hopkins | 248/311.2 X |
| 4,030,690 A | * | 6/1977 | Hanauer et al. | 248/311.3 |
| 4,036,463 A | * | 7/1977 | Hopkins et al. | 248/311.2 X |
| 4,126,366 A | * | 11/1978 | Handler et al. | 312/252 |
| D253,629 S | * | 12/1979 | Sage | D7/70 |
| 4,270,724 A | * | 6/1981 | McMullen | 248/311.2 X |
| D267,625 S | | 1/1983 | Dark | |
| 4,535,923 A | * | 8/1985 | Manke | 224/273 |
| 4,570,835 A | * | 2/1986 | Criqui et al. | 224/36 |
| 4,616,795 A | * | 10/1986 | Bender | 248/103 |
| 4,634,016 A | * | 1/1987 | Voss | 220/69 |
| 4,635,816 A | * | 1/1987 | Mikkelsen | 221/11 |
| 4,697,780 A | * | 10/1987 | Wenkman et al. | 248/558 |
| 4,709,424 A | * | 12/1987 | Dolan | 4/228 |
| 4,815,483 A | * | 3/1989 | DuGrenier et al. | 132/295 |
| D300,699 S | * | 4/1989 | Penrod | D6/405 |
| 4,844,399 A | * | 7/1989 | Harm | 248/311.2 |
| D303,057 S | * | 8/1989 | Smith | D7/70 |
| D303,738 S | * | 10/1989 | Ziaylek, Jr. | D6/457 |
| 4,887,784 A | * | 12/1989 | Kayali | 248/311.2 |
| 4,903,929 A | | 2/1990 | Hoffman | |
| 4,919,380 A | * | 4/1990 | Ely, Jr. | 248/311.2 |
| 4,953,696 A | * | 9/1990 | Huang et al. | 206/214 |
| 4,990,254 A | * | 2/1991 | Toida et al. | 210/464 |
| 4,993,675 A | | 2/1991 | Walker | |
| 5,009,336 A | * | 4/1991 | Liaw | 211/69.1 |
| 5,010,929 A | * | 4/1991 | Tisma | 141/142 X |
| 5,044,577 A | * | 9/1991 | Spearman | 224/42.45 R |
| 5,071,100 A | * | 12/1991 | Sweeny | 248/311.2 X |
| D324,141 S | * | 2/1992 | Wu | D6/457 |
| 5,094,415 A | * | 3/1992 | Revette et al. | 248/133 |
| 5,102,086 A | * | 4/1992 | Thomason | 248/311.2 |
| 5,106,046 A | | 4/1992 | Rowles et al. | |
| 5,152,489 A | * | 10/1992 | Christensen et al. | 248/311.2 |
| 5,186,196 A | * | 2/1993 | Gorka et al. | 135/16 |
| 5,190,257 A | | 3/1993 | Gradei et al. | |
| D342,281 S | | 12/1993 | Lin | |
| 5,295,650 A | * | 3/1994 | Brandt | 248/311.2 |
| 5,313,866 A | * | 5/1994 | Smith | 248/231.4 |
| 5,320,263 A | | 6/1994 | Kobylack | |
| 5,337,892 A | * | 8/1994 | Zaffina | 206/315.11 |
| D350,456 S | | 9/1994 | Linder | |
| 5,370,060 A | * | 12/1994 | Wang | 108/44 |
| 5,395,208 A | * | 3/1995 | Mojden et al. | 414/795.8 |
| 5,454,537 A | | 10/1995 | Meeker et al. | |
| 5,474,273 A | * | 12/1995 | Vinal | 248/311.2 |
| D368,411 S | * | 4/1996 | Delaney | D7/620 |
| 5,577,692 A | * | 11/1996 | Rollins | 248/106 |
| 5,580,020 A | * | 12/1996 | Catchings | 248/311.2 |
| 5,598,999 A | * | 2/1997 | Plocher et al. | 248/311.2 |
| 5,641,096 A | * | 6/1997 | Robbins et al. | 222/284 |
| 5,662,299 A | * | 9/1997 | Mejia | 248/311.2 X |
| 5,664,746 A | * | 9/1997 | Benzakarya | 248/106 |
| 5,740,906 A | * | 4/1998 | Lai | 206/214 |
| 5,765,821 A | * | 6/1998 | Janisse et al. | 269/16 |
| 5,803,327 A | * | 9/1998 | Nipper et al. | 224/407 |
| 5,813,579 A | * | 9/1998 | Hendrickson | 248/311.2 X |
| 5,823,360 A | * | 10/1998 | Gorosave | 211/13.1 |
| 5,823,486 A | * | 10/1998 | Smith et al. | 248/104 |
| 5,823,496 A | * | 10/1998 | Foley et al. | 248/311.2 X |
| 5,842,671 A | * | 12/1998 | Gibbs | 248/311.2 X |
| 5,853,158 A | * | 12/1998 | Riggle | 248/311.2 |
| D404,975 S | * | 2/1999 | Fegan | D7/620 |
| 5,897,089 A | * | 4/1999 | Lancaster et al. | 248/311.2 |
| 5,931,315 A | * | 8/1999 | Lorentz et al. | 211/40.1 |
| 5,992,624 A | * | 11/1999 | Hodson | 206/372 |
| 5,996,957 A | * | 12/1999 | Kurtz | 248/311.2 |
| 6,010,017 A | * | 1/2000 | Michaelis et al. | 211/133.4 |
| 6,123,306 A | * | 9/2000 | Jackson | 248/296.1 |
| 6,244,554 B1 | * | 6/2001 | Baker | 248/312 |

* cited by examiner

SECURED RECEPTACLE HOLDER

CROSS-REFERENCE TO RELATED APPLICATIONS

The present application is a continuation-in-part of application Ser. No. 08/745,371 which was filed on Nov. 8, 1996, now U.S. Pat. No. 5,842,671.

BACKGROUND OF THE INVENTION

1. Field of Invention

This invention relates generally to a receptacle holder, and more particularly to a removable holder that can be securely mounted and adjusted on a multitude of surface types or members.

2. Description of Prior Art

In the prior art, several holders have been made available for supporting a beverage container when a person drinking from the container puts the container down to perform another activity. Originally, holders were made to be hung over the edge of a car window. This meant that the holder was dependent on the window being opened. This problem has been partially solved by other inventions where mounting is on the interior side of a vehicle door, but these had and still have significant problems. The mug holder in U.S. Pat. No. 5,106,046 to Rowles, Apr. 21, 1992, can still be disturbed by the movement of a car window and lacks a secure mounting feature making it easy for it to be knocked off a vehicle door if bumped against. Limitations also include only being able to mount to the interior of a car door and the inability to support different sizes and weights of containers due to weak materials; nor does it have a feature that would prevent dripping or "sweating" from a container to the surface below. Where the cup holder in U.S. Pat. No. 5,454,537 to Meeker, Oct. 3, 1995, does add a feature which prevents dripping onto another surface, it is still limited to mounting onto a particular type of surface. It also uses a large amount of space and material and, similar to the Rowles patent, the cup or mug position cannot be adjusted once mounted onto a surface. The container in U.S. Pat. No. 5,190,257 to Gradei, Mar. 2, 1993, helps to solve the problem of mounting to a moving object that the previous referenced patents had addressed. But its mounting feature is still limited to mounting to a certain type of surface, while also adding the possibility of damaging the mounted surface.

SUMMARY OF THE INVENTION

Accordingly, several objects and advantages of my invention are: the ability to mount to a multitude of different surface types for use in several environments; the ability to have a holder securely mounted which avoids being easily knocked over; the ability to protect surfaces from being damaged from mounting; the improved ability to protect underlying surfaces from moisture due to dripping or "sweating"; a compact design whereby the amount of space used is minimal; improved methods and results for adjusting a holder on moving or sloped objects or surfaces; and improved materials allowing support of containers of different weight, size and shape such as cups, cans, bottles, spray cans, etc. The secured receptacle holder may also be used to hold or support other items such as, but without limitation, writing and drawing instruments such as pens, pencils, erasers; art supplies such as paints and brushes; office supplies such as paper clips, Post-it Notes®, etc.; and other business, office or personal items.

Other objects and advantages are:

a. to provide a method of securing a holder on surfaces of varying widths;

b. to provide a method of securing a holder in an inverted position while maintaining a receptacle in a level position;

c. to provide a holder that can be clamped to a surface of any inclination;

d. to provide a holder that rotates 360 degrees so as to align or face the holder in a multitude of directions or positions;

e. to provide a holder that is easy to assemble and disassemble; and f. to provide a holder that is durable and attractive for use in a multitude of environments including home and office.

One aspect of the present invention a support for holding one or more receptacles. The support includes a support post having a first end and a second end, and the support post extends generally along a longitudinal axis. A base is attached to said first end of the support post and the base is configured to support the support post. A holder is connected to the second end of the support post and the holder includes a support member, a base support and support walls. The support walls and the base support are connected for holding the receptacles. The holder is advantageously configured to be placed in a desired position relative to said support post. Desirably, the holder is pivotably or rotatably attached to said support post and the support post preferably has a length greater than a length of said support member.

The support may also include a second base support and second support walls, the second support walls and the second base support for holding receptacles. The support may also include a plurality of base supports and a plurality of support walls which are connected for holding a plurality of receptacles. Additionally, the support may include a second holder with a second base support and second support walls, the second support walls and the second base support are connected for holding the receptacles. Further, the support may include one or more outwardly extending trays connected to the holder.

In another aspect of the invention, the holder supports at least two receptacles clear of a surface. The holder includes a support means for holding at least two receptacles; a post means for carrying the support means, the post means having a length greater than a length of the support means; a positioning means attached to the post means, the positioning means for positioning the support means on the surface; and means for connecting the support means to the positioning means. The support means may include a holder with a support member, a base support and support walls, the support walls and the base support connected for supporting the receptacles. The support means may also include a plurality of base supports and a plurality of support walls, the support walls are connected to the base supports for holding a plurality of receptacles. The holder may also include second support means for holding receptacles. The second support means preferably includes a second base support and second support walls, the second base support and the second support walls are connected for holding the receptacles. Additionally, the support means may be rotatably or pivotably attached to the post means.

Yet another aspect of the invention is a holder for supporting at least two receptacles clear of a surface. The holder includes a support means for holding the receptacles; a post means having a length greater than the support means, the post means for carrying the support means, the post means generally extending along an axis; a positioning means attached to the post means, the positioning means for positioning the support means on the surface; and a means for connecting the support means to the positioning means and for allowing the support means to rotate about the axis.

Still another aspect of the invention is a method for supporting a plurality of receptacles clear of a surface. The method includes providing a main post having a top, a bottom and a longitudinal axis; providing a rotator ring; attaching the rotator ring proximate the top of the main post; providing a holder connected to the rotator ring, the holder including a support member, a base support and a plurality of support walls, the support walls and the base support connected for holding the receptacles; providing means for positioning the main post on the surface; and attaching the means for positioning to the bottom of the main post.

Additional objects and advantages are to provide a receptacle holder that can be manufactured with a variety of interchangeable colored parts using injection molding or other means to obtain a strong and durable structure, to make replacement of damaged parts easy, can embody multiple holders, and which can use a variety of clamping configurations.

Further aspects, features and advantages of the present invention will become apparent from the detailed description of the preferred embodiments that follows.

BRIEF DESCRIPTION OF THE DRAWINGS

The appended drawings contain figures of preferred embodiments of the present secured receptacle holder. The above-mentioned features of the secured receptacle holder, as well as other features, will be described in connection with the preferred embodiments. However, the illustrated embodiments are only intended to illustrate the invention and not limit the invention. The drawings contain the following figures.

DETAILED DESCRIPTION OF THE PREFERRED EMBODIMENT

Figure 1:
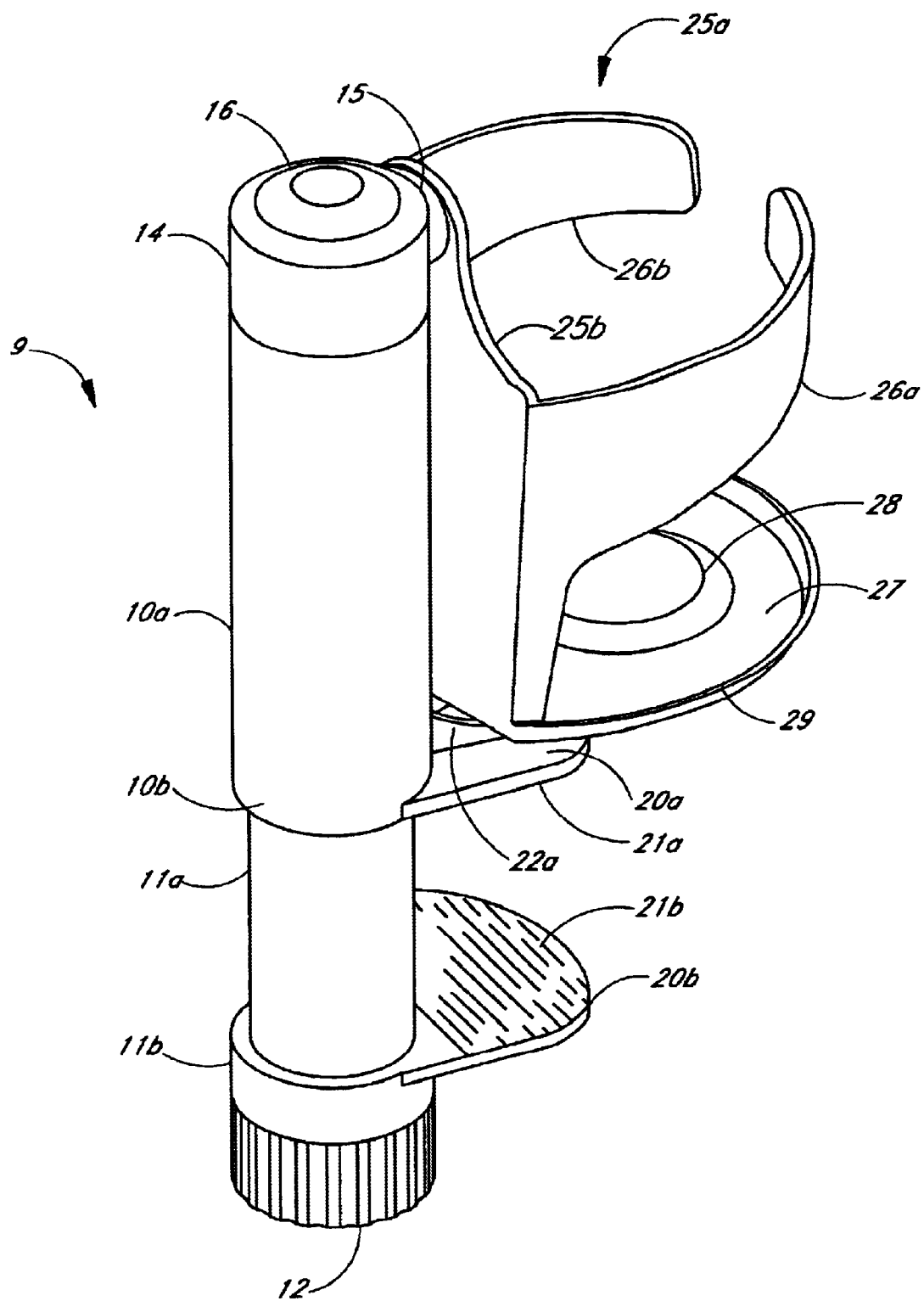
FIG. 1 shows a perspective view of a preferred embodiment of the secured receptacle holder, illustrating the fully assembled and fully extended position with the holder aligned with the clamping members.

| Reference Numerals In Drawing | | | |
|---|---|---|---|
| 9 | secured receptacle holder | 10a | main securing post |
| 10b | main post bottom | 10c | main post top |
| 11a | lower securing post | 11b | lower post bottom |
| 12 | clamping compression knob | 13 | structural connection |
| 14 | receptacle support rotator | 15 | thread stabilizer housing |
| 16 | securing gap | 17a | main disk thread support |
| 17b | lower disk thread support | 18a | main clamping thread insert |
| 18b | lower clamping thread insert | 19 | clamping screw |
| 20a | main clamping member | 20b | lower clamping member |
| 21a | main direct contact surface | 21b | lower rib configuration |
| 22a | main rib configuration | 22b | lower rib configuration |
| 23 | thread insert stabilizer | 24 | receptacle support lock |
| 25a | holder | 25b | holder leg |
| 25c | holder support hole | 26a | left holder arm |
| 26b | right holder arm | 27 | base support |
| 28 | raiser | 29 | base lip |
| 30 | locking groove | 31 | pedestal base |
| 32 | inclined surface | 33 | surface |
| 38 | holders | 40 | support member |
| 42 | spokes | 44 | rim |
| 46 | support walls | 48 | opening |
| 50 | front wall | 52 | back wall |
| 54 | side wall | 56 | side wall |
| 58 | base support | 60 | holders |
| 62 | support member | 64 | base support |
| 66 | base lip | 68 | holder arms |
| 70 | outer wall | 72 | dividers |
| 74 | upper portion | 76 | outer wall |
| 78 | dividers | 80 | lower portion |
| 82 | base support | 84 | support wall |
| 86 | support wall | 88 | support wall |
| 90 | dividers | 92 | tray |
| 94 | opening | 100 | holders |
| 102 | support member | 104 | upper holders |
| 105 | support walls | 106 | outer wall |
| 108 | side wall | 110 | lower holders |
| 111 | support walls | 112 | outer wall |
| 114 | side walls | 116 | base supports |
| 118 | trays | 120 | base support |
| 122 | support walls | 130 | holders |
| 132 | support member | 134 | upper holders |
| 136 | outer wall | 138 | side wall |

-continued

Reference Numerals In Drawing

| 140 | back wall | 142 | partitions |
| 144 | lower holders | 146 | outer wall |
| 148 | side wall | 150 | back wall |
| 152 | partitions | | |

The present invention involves a secured receptacle holder for holding or supporting one or more items such as containers of various shapes, sizes and weights. These containers, for example, but without limitation, may be cups, cans, bottles, beverage containers, etc. The secured receptacle holder may also hold or support other items such as, but without limitation, writing and drawing instruments such as pens, pencils, erasers; art supplies such as paints and brushes; office supplies such as paper clips, Post-it Notes®, etc.; and other business, office or personal items. Accordingly, the principles of the present invention are not limited to a receptacle holder for holding or supporting specific items or containers and it will be understood that, in light of the present disclosure, the secured receptacle holder disclosed herein can be successfully used in connection with other types of items.

Additionally, to assist in the description of the secured receptacle holder, words such as top, bottom, front, rear, right and left are used to describe the accompanying figures. It will be appreciated, however, that the present invention can be located in a variety of desired positions—including various angles, sideways and even upside down. A detailed description of the secured receptacle holder now follows.

One typical embodiment of a secured receptacle holder 9 is illustrated in FIGS. 1–4. The secured receptacle holder 9 is made by molding, injection molding or other means for creating a strong and durable structure. The secured receptacle holder 9 has a main securing post 10a and a lower securing post 11a, both of which are hollow. The lower post 11a has a diameter smaller than that of the main post 10a, thus allowing the lower post 11a to enter or telescope into the main post 10a.

The main post 10a contains a main disk thread support 17a, and the thread support 17a contains a main clamping thread insert 18a. Likewise, the lower post 11a contains a lower disk thread support 17b, and the thread support 17b contains a lower clamping thread insert 18b as seen in a cross-section of the invention in FIG. 3.

The main post 10a has a main bottom 10b. Connected to the main post bottom is a main clamping member 20a; and connected to both the main post bottom 10b and the main clamping member 20a is a main rib configuration 22a for added strength. Likewise connected to the lower post 11a is a lower post bottom 11b. And connected to the lower post bottom 11b is a lower clamping member 20b; and connected to both the lower post bottom 11b and the clamping member 20b is a lower rib configuration 22b for added strength.

Figure 2:
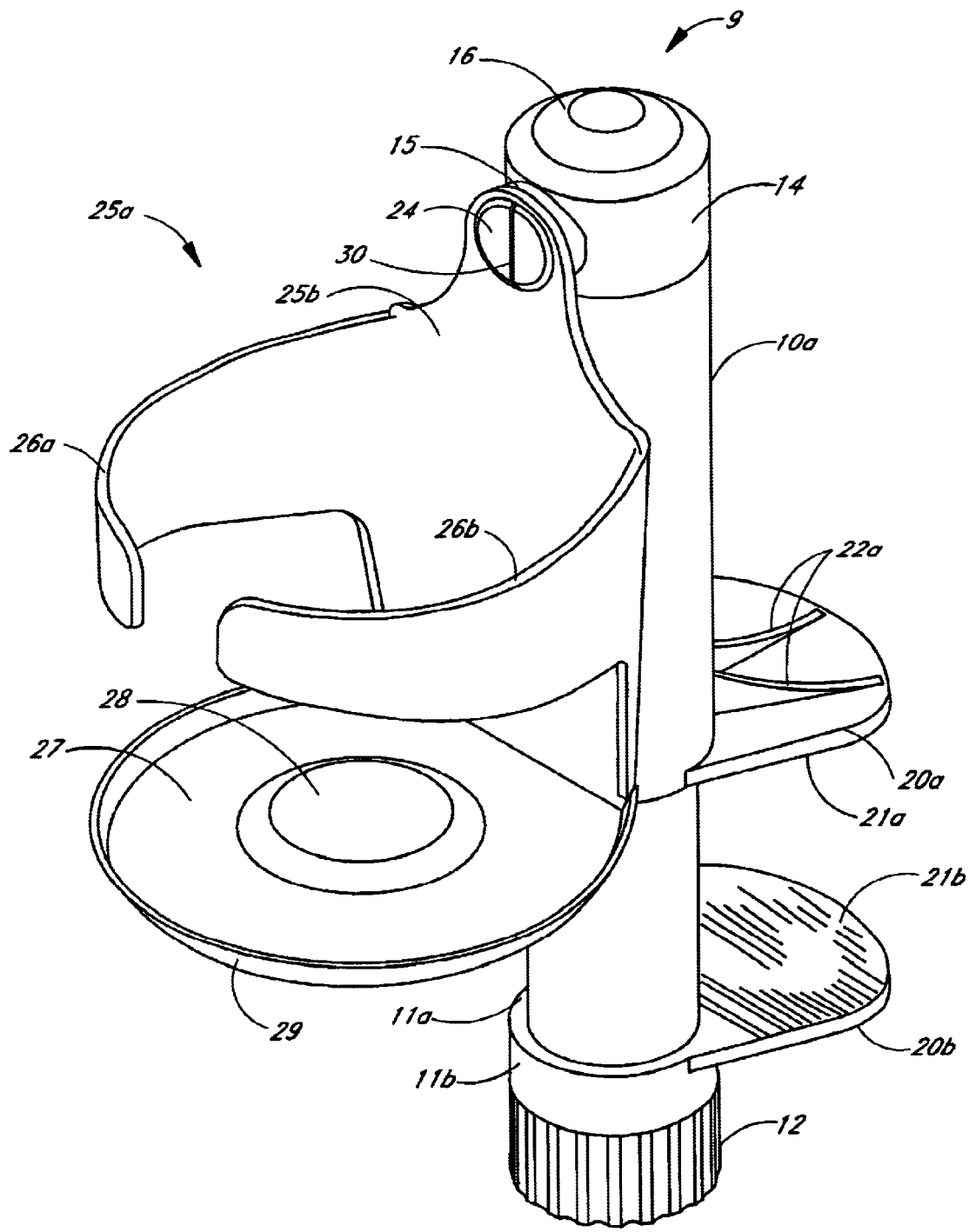
FIG. 2 shows a perspective view of the secured receptacle holder shown in FIG. 1, illustrating the holder on the opposite side of the clamping members after 180 degree rotation around the center pivot point of the product.

The main clamping member 20a has a main direct contact surface 21a. Likewise the lower clamping member 20b has a lower direct contact surface 21b as shown in FIGS. 1 and 2. The contact surfaces 21a and 21b are made slip-resistant by molding, rubber pads or other means.

Figure 3:
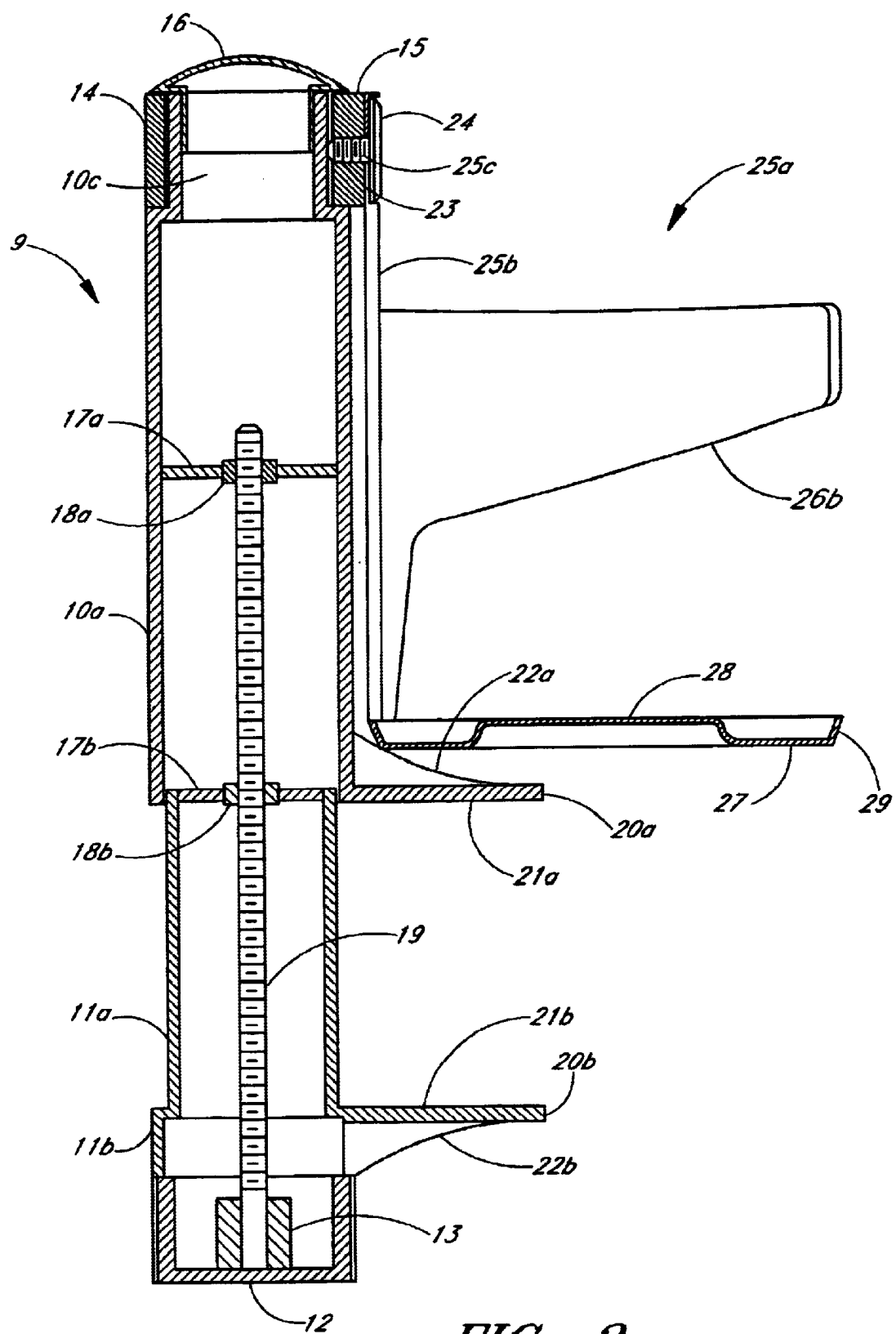
FIG. 3 shows a cross-sectional side view of the secured receptacle holder shown in FIG. 1, illustrating the fully assembled and fully extended position allowing viewing of the interior components.
Figure 4:
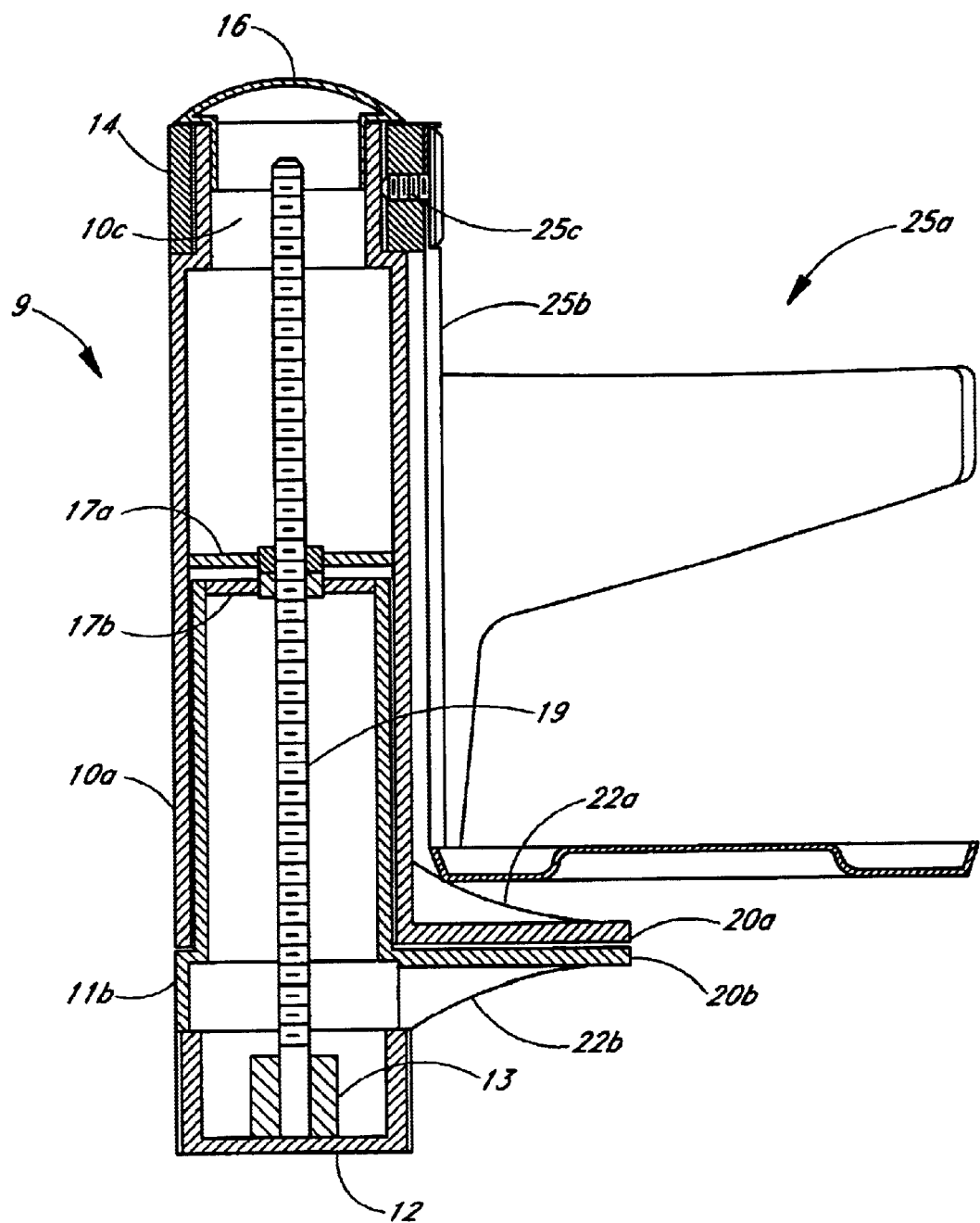
FIG. 4 shows a cross-section side view of the secured receptacle holder shown in FIG. 1, illustrating the fully assembled and fully clamped position and allowing viewing of the interior components.

As shown in FIG. 3, the main post 10a and the lower post 11a are attached together by a clamping screw 19 which is connected to the center of a structural connection 13; and the structural connection 13 is connected to the center of a clamping compression knob 12. Turning the compression knob 12 clockwise causes the clamping screw 19 to thread upwardly through the thread inserts 18a and 18b. This same turning of the compression knob 12 causes the clamping members 20a and 20b to be driven toward one another as indicated by FIG. 4, thus allowing the secured receptacle holder 9 to be securely mounted onto a table, desk, shelf, pole or other surface. Turning the compression knob 12 counter clockwise causes the clamping members 20a and 20b to be driven apart thus detaching from surface.

The main post 10a has a main post top 10c which is smaller in diameter than the main post 10a as shown in FIG. 3. The main post top 10c is about one inch in length from the top. A receptacle support rotator 14 surrounds this. The supporter rotator 14 is held in position around the smaller diameter of the main post top 10c by a securing cap 16 which is glued, threaded, or attached by other means to securely fit inside the top of the main post top 10c. Attached by molding or other means to the support rotator 14 is a thread stabilizer housing 15 which has a thread insert stabilizer 23 in its center. Screwed into the thread insert stabilizer 23 is a receptacle support lock 24. The support lock 24 contains a locking groove 30 as shown in FIG. 2. The support lock 24 is long enough to screw through the width of the stabilizer housing 15 until it touches the smaller diameter of the main post top 10c, thus locking the support rotator 14 in place.

Sandwiched between the support lock 24 and thread stabilizer 15 is a holder 25a as shown in FIGS. 3 and 4. The holder 25a has a holder leg 25b which has a holder support hole 25c at its top. The holder 25a also has two oppositely curved arms, a left holder arm 26a and a right holder arm 26b. At the bottom of the holder 25a is a base support 27 that has a base lip 29 surrounding it. Attached by molding or other means to the top of the base support 27 is a raiser 28 which is smaller in diameter and slightly raised to allow for a nominal amount of space to exist between a receptacle and the base support 27.

Figure 6:
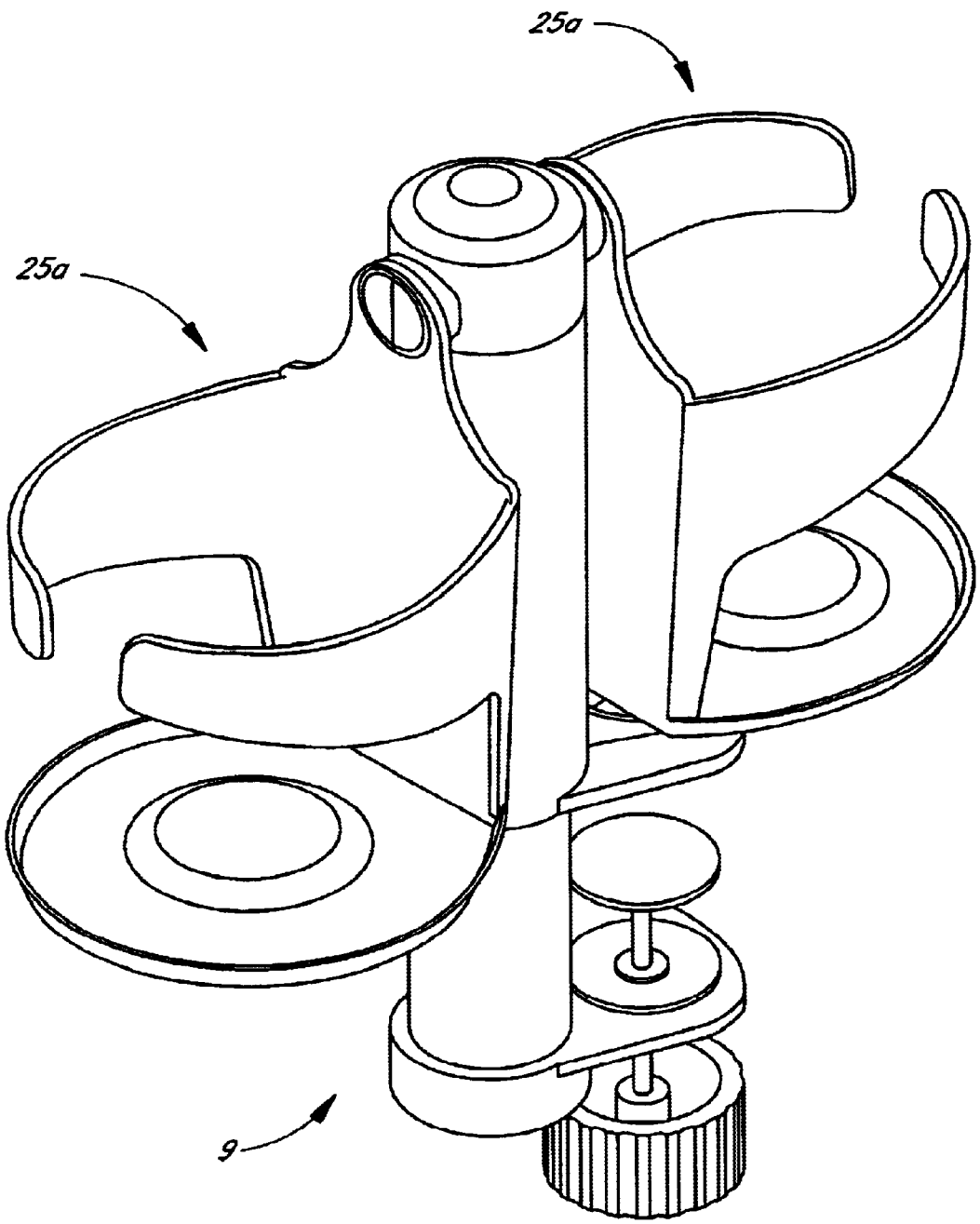
FIG. 6 shows a perspective view of another preferred embodiment of the secured receptacle holder, illustrating the fully assembled and fully extended position with multiple holders and a modification of the clamping members.
Figure 7:
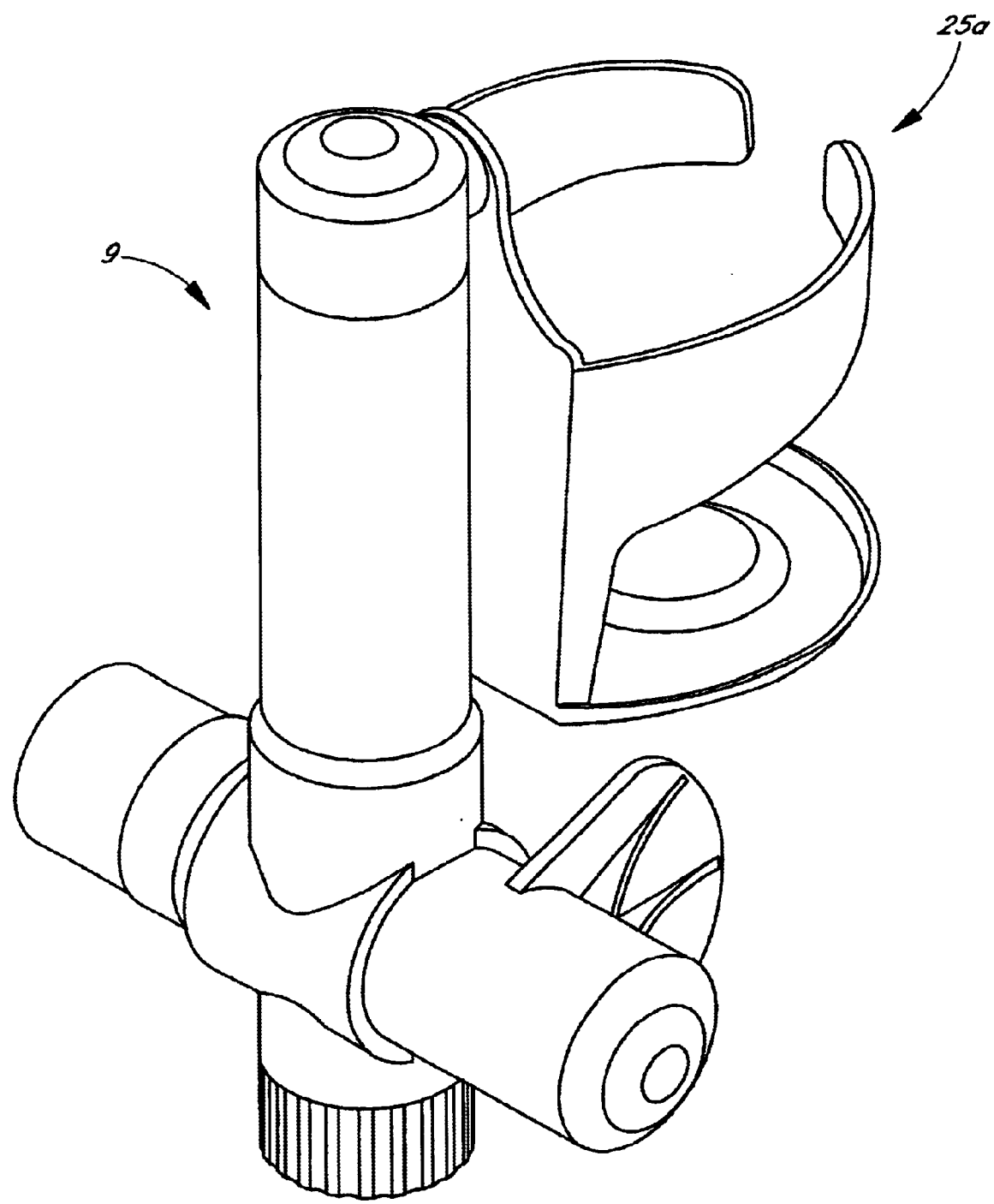
FIG. 7 shows a perspective view of yet another preferred embodiment of the secured receptacle holder, illustrating the fully assembled and fully extended position with a perpendicular modification of the clamping members.
Figure 8:
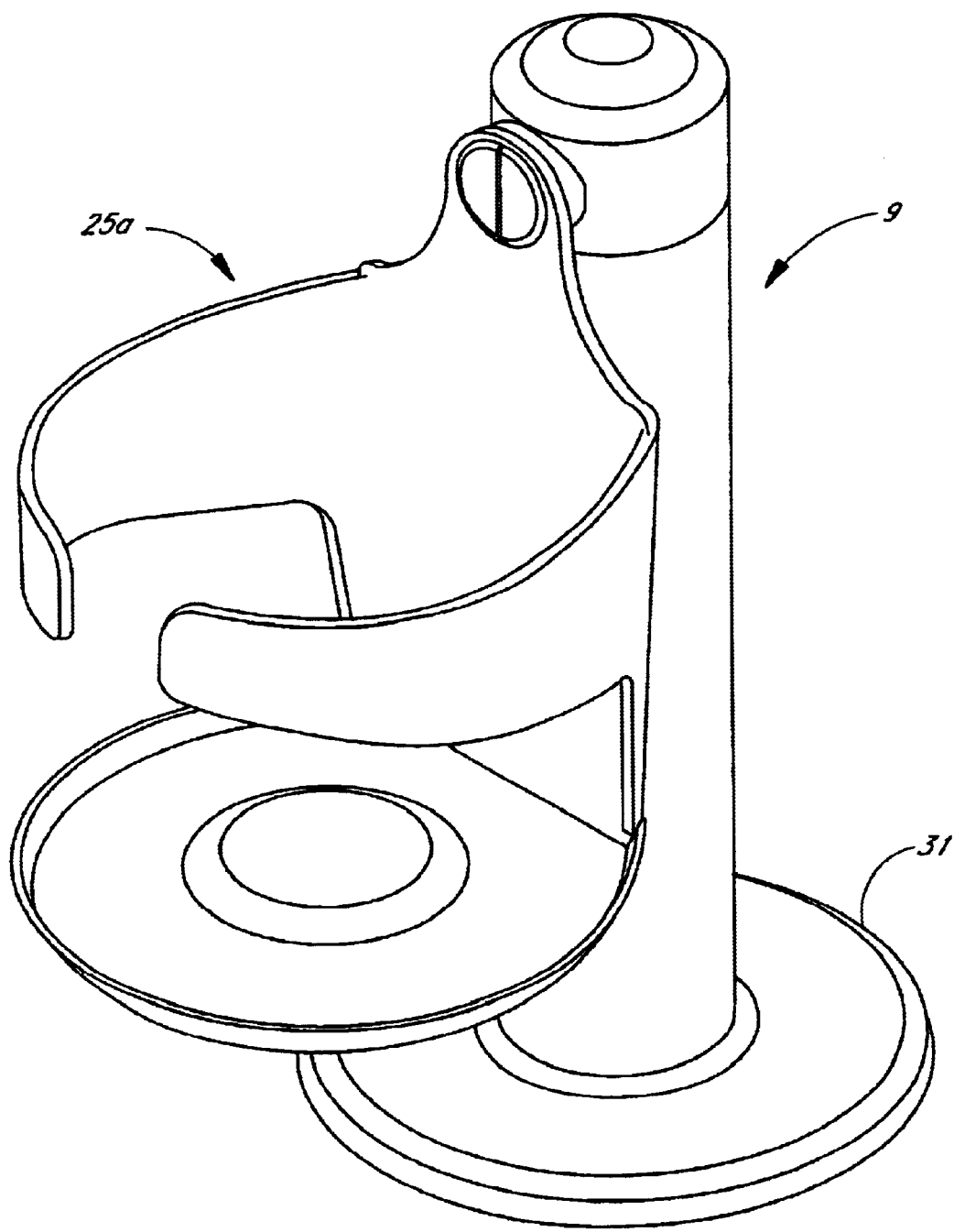
FIG. 8 shows a perspective view of still another preferred embodiment of the secured receptacle holder, illustrating the secured receptacle holder with a pedestal base.

Additional embodiments are shown in FIGS. 6, 7 and 8. The holder 25a in FIG. 6 is multiplied in number, allowing for an additional receptacle to be supported. The holder 25a can be multiplied without limit by merely increasing the diameter or altering the design of the main post 10a. The clamping members 20a and 20b are also shown to have a different embodiment whereby clamping is achieved by a screw with a means at its top for helping to stabilize said secured receptacle holder 9 as it applies pressure directly onto a surface, much like a standard C-clamp.

Another embodiment as shown in FIG. 7 is where the clamping members 20a and 20b feature a perpendicular embodiment to improve the clamping capability to a vertical post, or the like. Curving of the clamping members or curved material used as the direct contact surface (not shown), similar to that of the holder arms 26a and 26b would also aid in attaching the secured receptacle holder 9 to a post.

And yet another embodiment as shown in FIG. 8 is where the clamping members 20a and 20b are replaced by a pedestal base 31 which has a protective under surface on its bottom. The pedestal 31 is either made using materials which give enough weight to stabilize the secured receptacle holder 9 on a flat surface, or a magnetized or suction type feature allowing for stability on a sloped surface.

Operation

The manner of using my secured receptacle holder 9 is clear and simple. First attach the main post 10a and the lower post 11a, which is smaller in diameter, by threading the clamping screw 19 through the thread inserts 18a and 18b. This is achieved when the compression knob 12 is turned clockwise, thus causing the structural connection 13 to rotate, which in turn causes the clamping screw 19 to thread through both of the thread inserts 18b and 18a while also causing the lower post 11a to telescope into the main post 10a. The thread insert 18b is held in place by the disk thread support 17b, while the thread insert 18a is held in place by the disk thread support 17a.

Figure 5A:
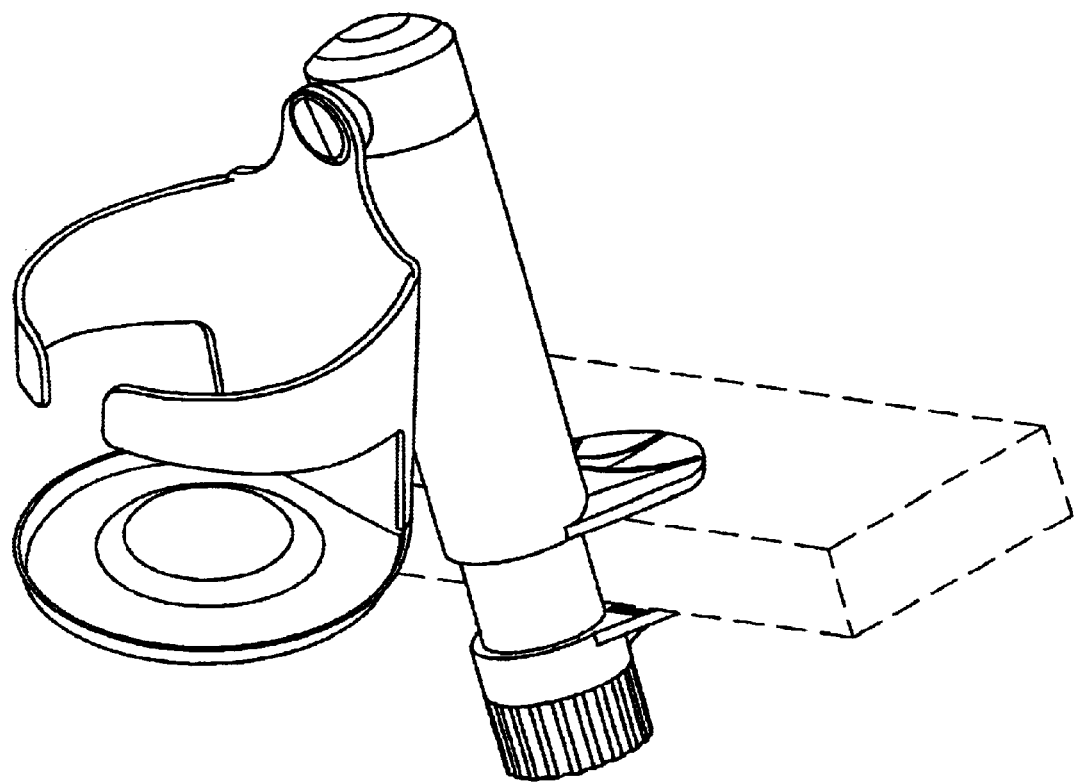
FIG. 5a shows a perspective view of the secured receptacle holder shown in FIG. 1, illustrating the holder clamped on a surface of average thickness with a slight slope or inclination.
Figure 5B:
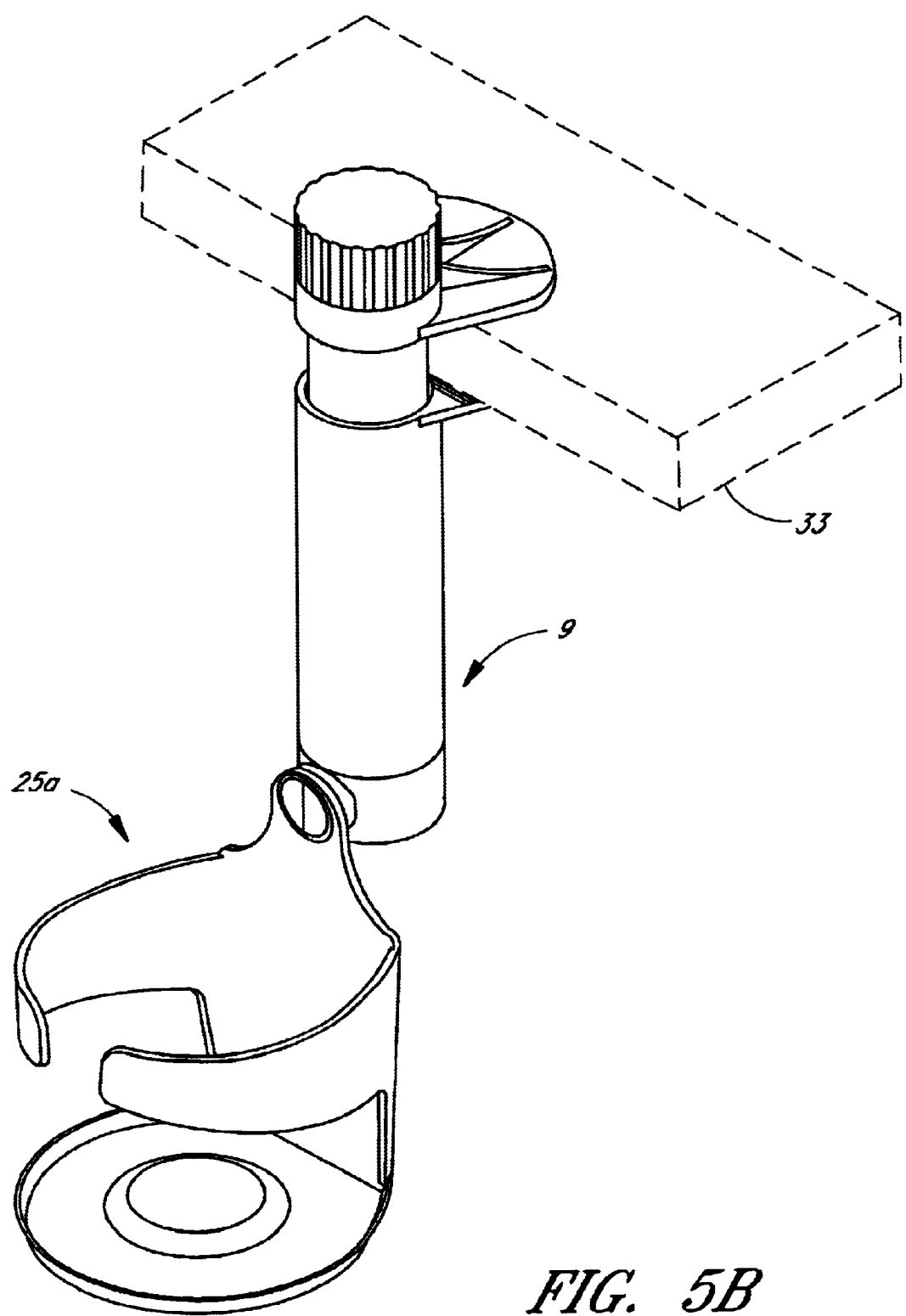
FIG. 5b shows a perspective view of the secured receptacle holder shown in FIG. 1, illustrating the holder clamped on a surface of average thickness in an inverted clamping position.
Figure 5C:
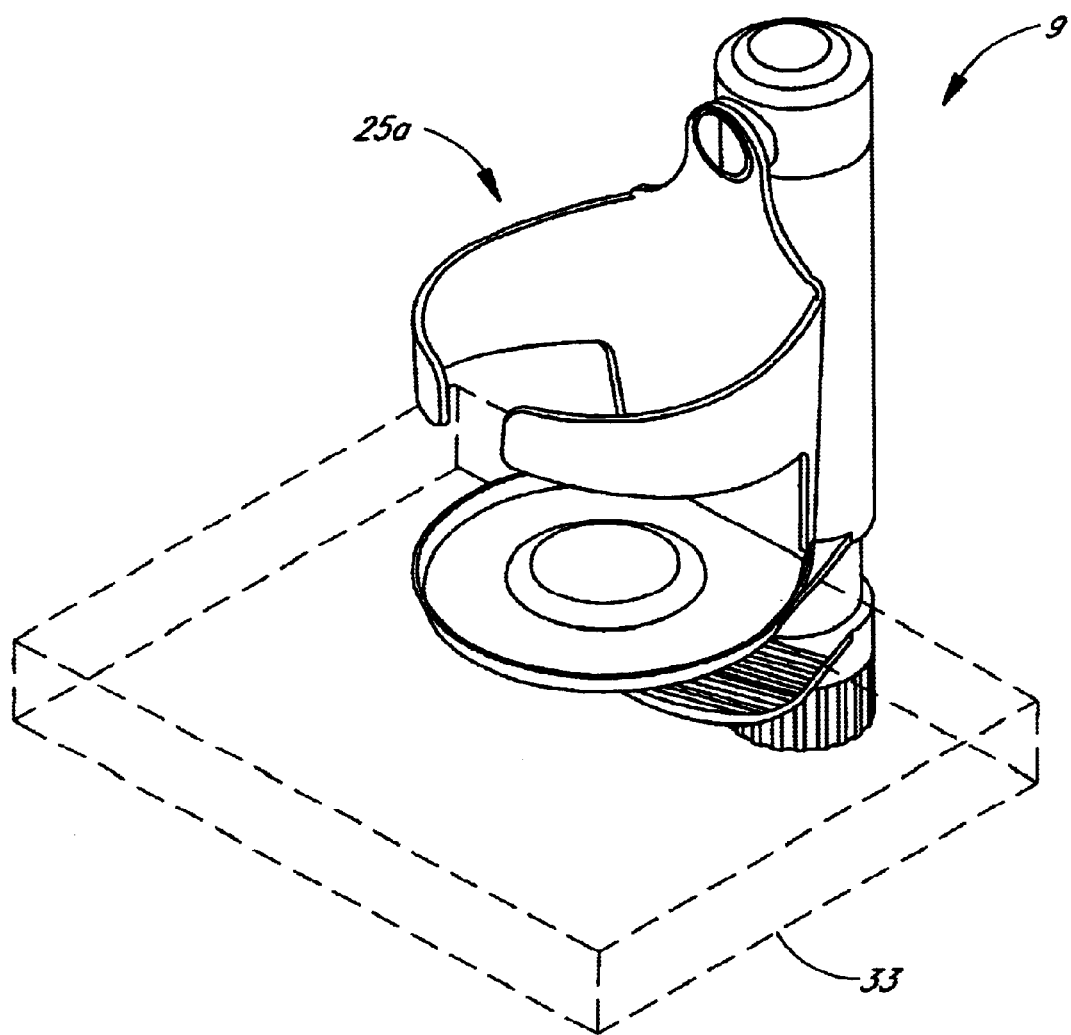
FIG. 5c shows a perspective view of the secured receptacle holder shown in FIG. 1, illustrating the holder clamped on a surface of average thickness with the holder aligned with the clamping members.

The secured receptacle holder 9 is then clamped onto a desk, table, shelf, dashboard, pole or other surface of about three inches or less in thickness. Clamping is achieved by aligning the clamping members 20a and 20b and positioning a surface 33 between them while then rotating the compression knob 12 further clockwise. This further rotation jointly causes the lower post 11a to further enter or telescope into the main post 10a in addition to causing the clamping members 20a and 20b to be driven toward one another until they are securely clamped onto the surface 33 as shown by FIGS. 5b and 5c.

There are a multitude of different surface types that this invention can be clamped onto. The secured receptacle holder 9 can mount to either a level surface as shown by FIGS. 5b and 5c or an inclined surface 32 as shown by FIG. 5a. Once mounted the holder 25a can then be swiveled into desired position. Clamping is also possible in inverted positions whereby the main clamping member 20a is below and lower clamping member 20b is above the surface 33 as shown by FIG. 5b. Still additional surfaces can be accommodated by supporting the secured receptacle holder 9 by a pedestal 31 as shown FIG. 8.

After clamping is achieved the holder 25a can be placed in a level or alternately desired position by unlocking the support lock 24 which is threaded through the holder hole 25c. Once unlocked the holder 25a can use gravity or other means to be swiveled into desired position. The support lock 24 can be unlocked by placing a twenty-five cent piece, a screwdriver, or other common object into its locking groove 30 as shown in FIG. 2, and turning it counter clockwise one quarter turn, about 90 degrees. This action causes the support lock 24 to rotate within the stabilizer housing 15, thread through the thread insert 23 and move away from the main post top 10c that it is engaged against to achieve a locked position. this action also allows enough space to exits between the support lock 24 and the stabilizer housing 15 for the holder 25a to freely swivel. Once the support lock 24 is in an unlocked position the holder 25a can also then be rotated 360 degrees around the longitudinal axis of the main post 10a by rotating the support rotator 14 which is held in place around the main post top 10c by the securing cap 16. The holder 25a can be aligned or angled with the clamping members 20a and 20b as shown FIG. 5c, aligned or angled on their opposite side as shown in FIG. 5a or anywhere in between. The holder 25a can also be left in place using gravity or can be secured in place by returning the support lock 24 to the locked position. Locking is achieved by turning the support lock 24, using a quarter or other object inserted into the locking groove 30, clockwise one quarter turn causing the support lock 24 to rotate within the stabilizer housing 15, thread through the thread insert 23 and engage itself against the main post top 10c, while simultaneously sandwiching the holder 25a into a locked position.

Once clamped and placed in a desired position, in holder 25a is ready to support the user's receptacle, beverage container, coffee cup or other object. The receptacle is lowered between the arms 26a and 26b and down upon the base support 27. The receptacle is supported above the clamped surface allowing for only a small amount of surface space to be used. Depending on the diameter of receptacle bottom or on its design, such as an incurvate like shape, the receptacle will either rest directly on the base support 27 or on the raiser 28. In the case where the receptacle has a protrusion or handle such as a coffee mug, the receptacle can be lowered in place with the handle positioned between the arms 26a and 26b allowing for each placement and retrieval. In the event that the receptacle drips or is cold and experiences "sweating" the moisture will drain downward and rest upon the outward portion of the base support 27 and between the raiser 28 and the base lip 29.

Figure 9:
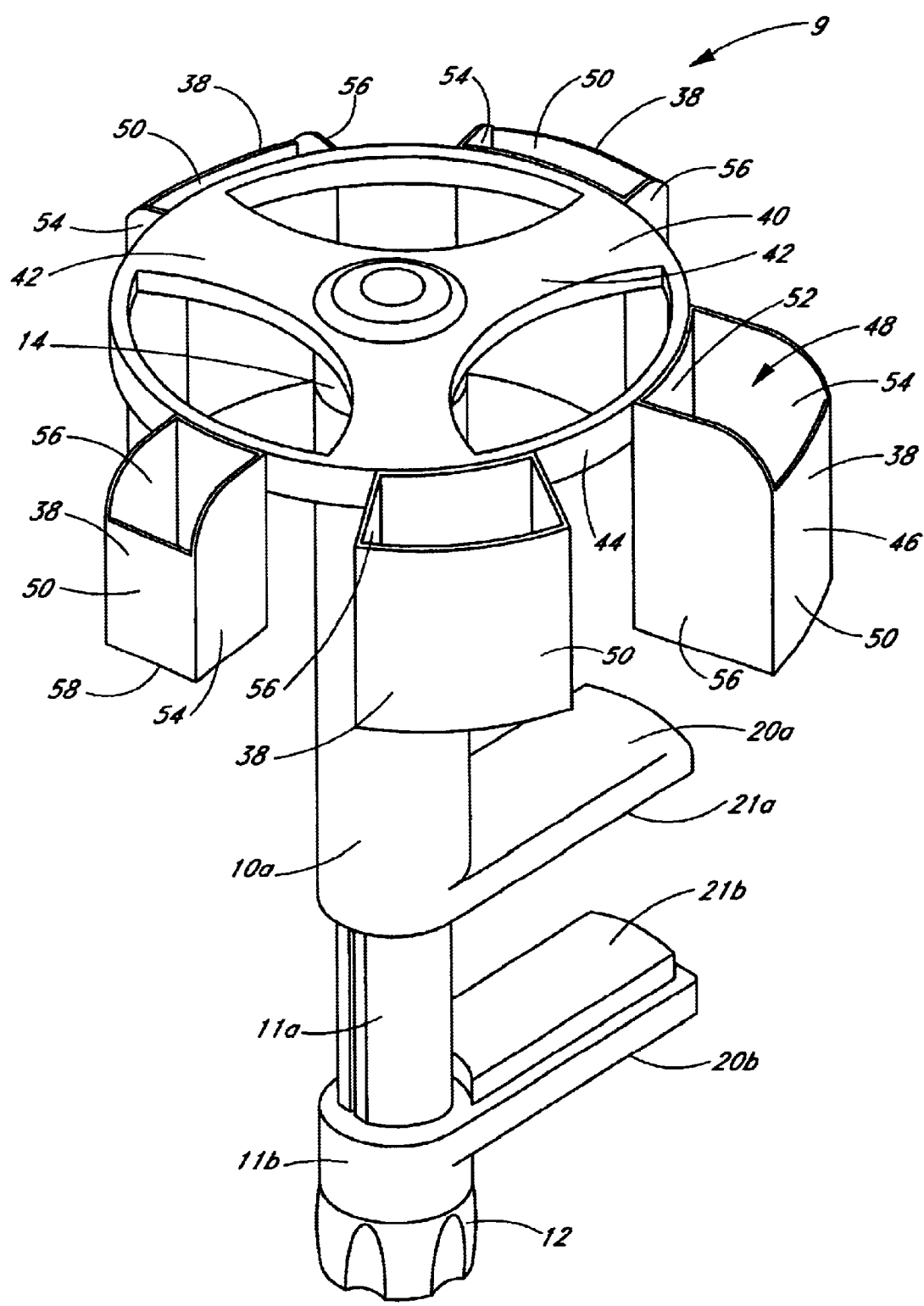
FIG. 9 shows a perspective view of another preferred embodiment of the secured receptacle holder, illustrating a plurality of holders.

As seen in FIG. 9, another preferred embodiment of the secured receptacle holder 9 includes a plurality of holders 38 connected to a support member 40. The support member 40 includes a plurality of spokes 42 and an outer rim 44, and the support member 40 is rotatably attached to the main securing post 10a but the support member can also be secured to the post in a fixed position. In particular, the support member 40 is preferably integrally formed with the rotator 14, but the support member may be releasably or securely attached to the rotator. Alternatively, the support member 40 may be used in place of the rotator 14. The support member 40 may also be lockable in a fixed position, for example, by a lock similar to the receptacle support lock 24 described above or other suitable means.

As shown in the accompanying figure, the secured receptacle holder 9 includes five holders 38 attached to the rim 44 of the support member 40, but any number of holders may be attached to the member in any desired position. Additionally, the holders 38 are preferably rigidly attached to the rim 44 in a fixed position, but the holders can also be pivotably or rotatably attached. Advantageously, this allows the holder 38 to be placed in a desired position relative to the support member 40 and/or main securing post 10a. Each holder 38 includes a plurality of support walls 46 and an opening 48 to allow desired items to be held or supported in the holder. As shown in FIG. 9, the support walls 46 include a front wall 50, back wall 52 and side walls 54, 56 which are connected to a base support 58. The support walls 46 and base support 58 are preferably connected to form holders 38 with a generally rectangular configuration, but the holders can have any desired size or shape depending, for example, upon the item or items to be supported or held by the holder. For example, the holders 38 may be shaped and configured to hold items such as, but without limitation, cups, cans, bottles, beverage containers, writing and drawing instruments, erasers, office supplies, business products and personal items. Thus, it will be understood by one skilled in the art that the holders 38 may have any number of support walls 46 and the walls may have any desired shape depending upon the items to be held or supported.

Figure 10:
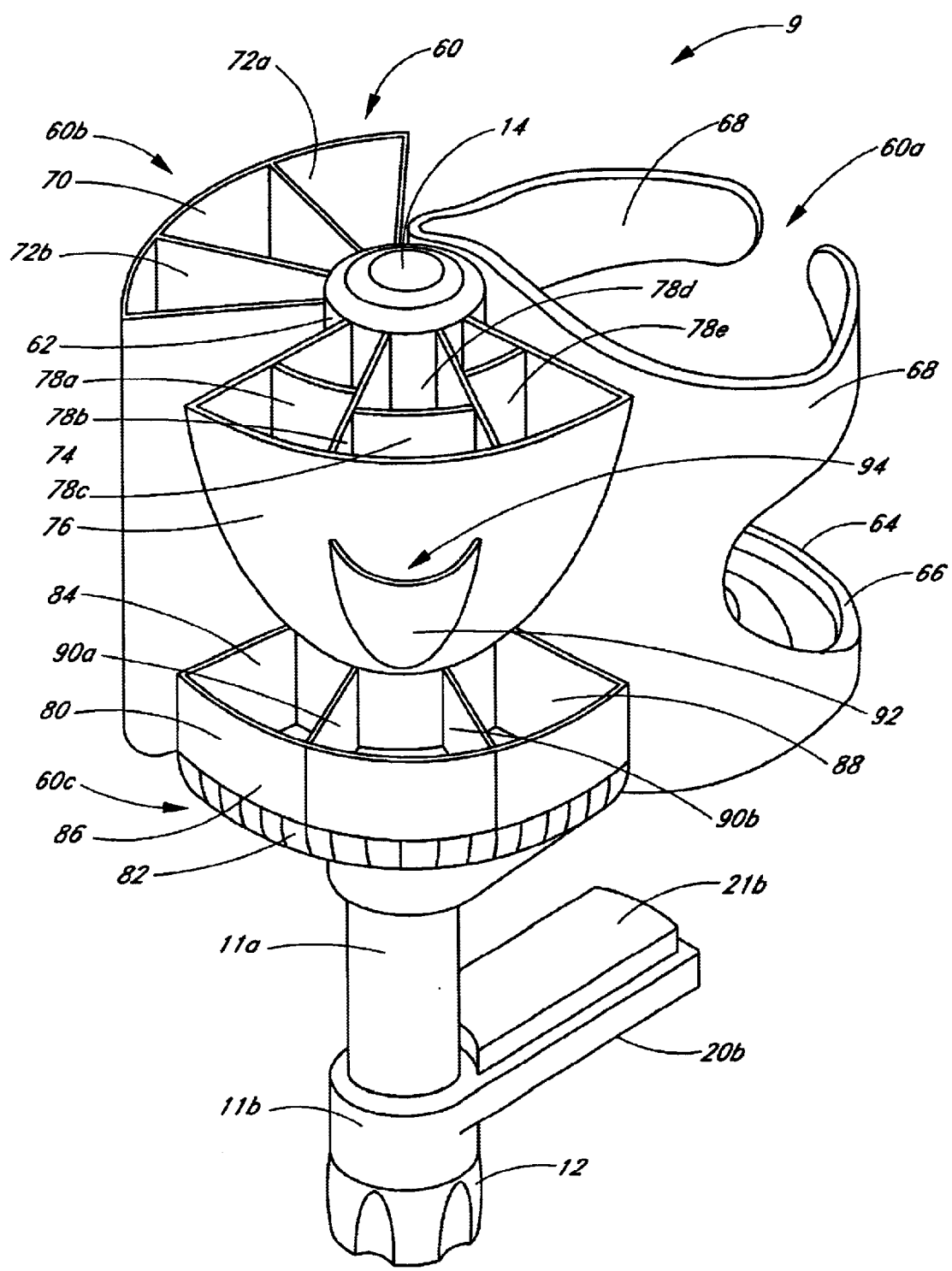
FIG. 10 shows a perspective view of yet another preferred embodiment of the secured receptacle holder, illustrating a plurality of holders.

As shown in FIG. 10, another preferred embodiment of the secured receptacle holder 9 includes a plurality of holders 60 connected to a support member 62 which is rotatably attached to the main securing post 10a, but the support member can also be secured to the post in a fixed position. The support member 62 is preferably integrally formed with the rotator 14, but the support member may be releasably or securely attached to the rotator and the support member may be locked in a fixed position, for example, by a lock similar to the receptacle support lock 24 described above.

The holders 60 shown in accompanying FIG. 10 are illustrative of a variety of different shapes, sizes and configurations depending, for example, upon the item to be held or supported. For example, holder 60a includes a base support 64 with a base lip 66 and a pair of holder arms 68; holder 60b includes a curved outer wall 70 with a pair of dividers 72a and 72b; and holder 60c includes an upper portion 74 with a curved outer wall 76 and a plurality of dividers 78a, 78b, 78c, 78d and 78e. The holder 60c also includes a lower portion 80 with a base support 82, support walls 84, 86 and 88, and dividers 90a and 90b. The holder 60c may also include an outwardly extending protrusion or tray 92 with an opening 94. It will be appreciated that the holders 60a, 60b and 60c may have any desired shape and configuration depending upon the items to be held or supported. The holders 60a, 60b and 60c may also be removably attached to the member 62 to permit holders of different sizes and configurations to be attached, and this advantageously increases the versatility of the secured receptacle holder 9.

Figure 11:
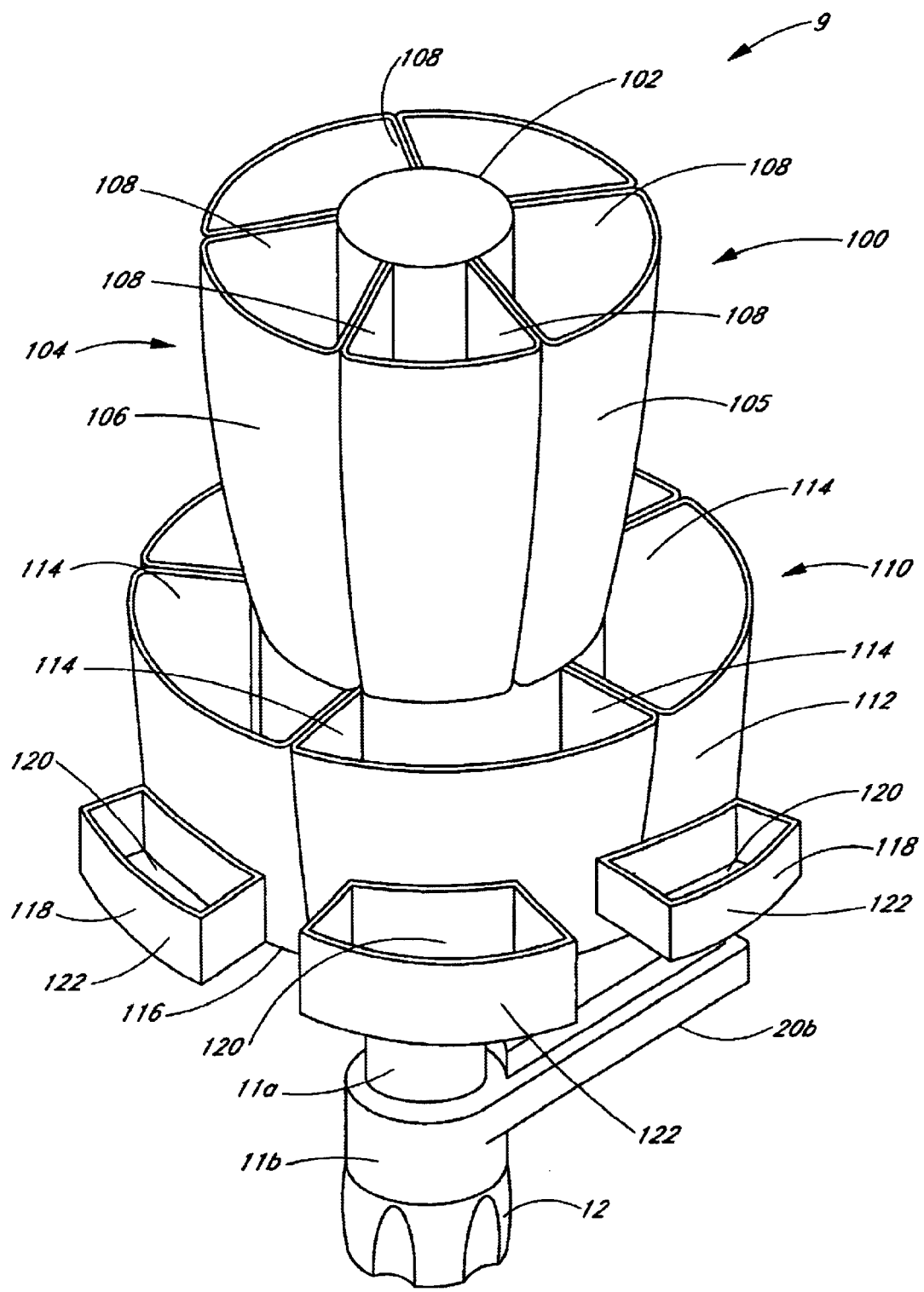
FIG. 11 shows a perspective view of still another preferred embodiment of the secured receptacle holder, illustrating a plurality of holders.

Another preferred embodiment of the secured receptacle holder 9 is shown in FIG. 11. The secured receptacle holder 9 includes a plurality of holders 100 which are attached to a support member 102. The support member 102 may be attached, for example, to the main securing post 10a or to the rotator 14. Alternatively, the support member 102 may be used in place of the rotator 14. The support member 102 is preferably rotatably attached to the receptacle holder 9, but the support member may also be fixed in a stationary position.

As shown in the accompanying figure, the support member 102 includes a plurality of holders 100 of different sizes and configurations. In this preferred embodiment, there are four upper holders 104 with support walls 105. The support walls include curved outer walls 106 and side Walls 108. The holder 100 also includes five lower holders 110 with support curved outer wall 112 and side walls 114 attached to base support 116. It will be appreciated that the holder 100 may have any desired size and configuration. The holder 100 also includes five outwardly extending trays 118 attached to the curved outer wall 112 of the lower holders 110. Each tray 116 has a generally rectangular configuration with a base support 120 and support walls 122. One skilled in the art will understand that the holders 100 and trays 118 may have any desired shape and configuration depending upon the item to be held or supported.

Figure 12:
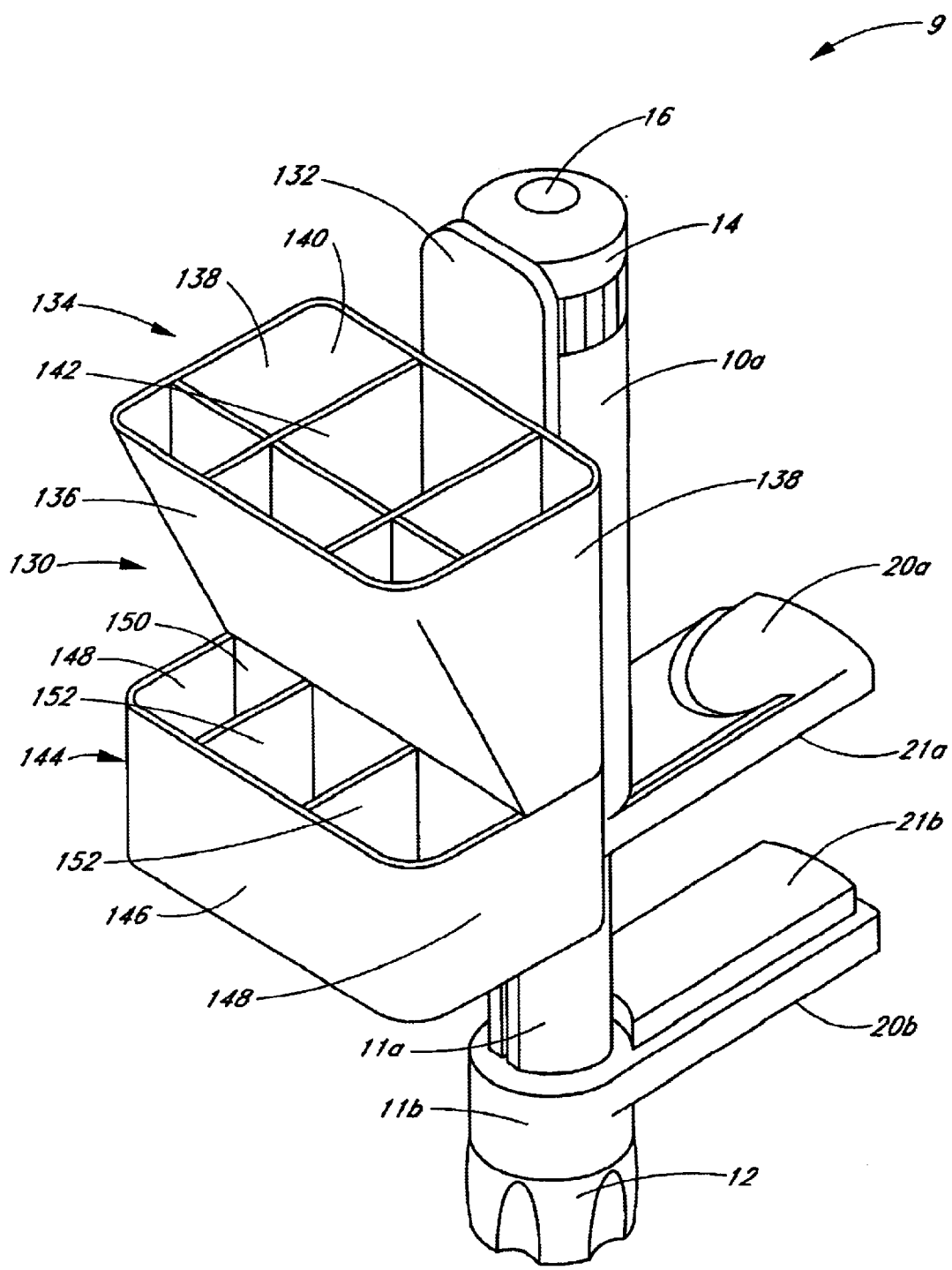
FIG. 12 shows a perspective view of a further preferred embodiment of the secured receptacle holder, illustrating a plurality of holders.

Yet another preferred embodiment of the secured receptacle holder 9 is shown in FIG. 12. The secured receptacle holder 9 includes a plurality of holders 130 which are attached to a center support member 132. The support member 132 is preferably attached to the rotator 14, but it can also be attached to the main securing post 10a or it can be used in place of the rotator 14. The support member 132 is preferably rotatably attached to the main securing post 10a, but the support member may also be fixed in a stationary position. Additionally, the support member 132 may be pivotably attached to the rotator 14, but the support member can also be attached in a fixed location.

As shown in the accompanying figure, the support member 132 includes upper holders 134 with an angled outer wall 136, side walls 138 and back wall 140. The holder 134 also includes partitions 142 to divide the upper holder 134 into portions with the desired size and configuration. The holder 130 also includes lower holders 144 with an outer wall 146, side walls 148 and back wall 150. The holder 144 also includes a pair of partitions 152 to divide the holder 144 into the desired size and configuration. As discussed above, it will be understood that the holder 130 may have any desired size and configuration depending upon the items to be held or supported.

Ramifications and Scope

The secured receptacle holder is a highly reliable, easy to use, yet economical device that can be used by a person of almost any age and in almost any profession. Advantages include a quick and easy manner for attaching and detaching to a surface, a secure and slip-resistant method of clamping to any surface, clamping within limited amounts of space and on varying surface locations, clamping to level as well as inclined surfaces, 360 degree rotation allowing holder to face in any direction, a means for clamping that protects surface from damage, clamping onto a multitude of different surface types, a method of securing a holder on surfaces of varying widths, use of strong and durable materials in compact amounts, support for receptacle level, a holder that protects a surface from wet areas due to "sweating," a holder for varying types of environments such as home, office or travel, a holder that is easy to assemble and disassemble, a holder that is attractive for use in a multitude of environments, and a pedestal support for use on alternate types of surfaces.

While the description above contains many specificities, these should not be construed as limitations on the scope of the invention, but rather as examples of several preferred embodiments. Many other variations are possible such as a larger or smaller size, multiple holders, different types of materials used in manufacturing, made integrally or in other types of connection sections, different colors, different means of clamping such as a screw applying direct pressure onto a surface similar to a C-clamp, different shapes, larger or smaller clamping width, supporting of objects other than receptacles, and alternate types of usage such as clamping small security camera or other device, etc.

Accordingly, the scope of the invention should be determined not by the embodiments illustrated, but by the appended claims and their legal equivalents.

Summary

This invention is one that contains at least one holder which can be securely clamped onto a surface of any inclination. The holder can rotate 360 degrees around its longitudinal axis and 360 degrees around a pivot point allowing holder to face in any direction. Thus, the secured receptacle holder is a highly reliable, easy to use, yet economical device that can be used by persons of almost any age in a home or work area of almost any profession.

What is claimed is:

1. A support for holding one or more items, comprising:
   a support post having a first end and a second end, said support post extending generally along a longitudinal axis;
   a base attached to said first end of said support post, said base configured to support said support post;
   a support member connected to said second end of said support post, and a plurality of holders connected to said support member so as to be wholly supported by the support member and arranged so that portions of said holders at least partially overlap the support post, at least two of said holders not being disposed vertically one above the other when the axis is arranged vertically, each of said holders being adapted to hold an item, a first one of said holders having a base support and a plurality of support walls, said support walls being connected to said base support, at least one of said holders being pivotably attached to said support post about an axis generally transverse to said longitudinal axis of said support post by a connector;
   wherein at least one said holders is configured to be selectively removable from said support post.

2. An apparatus configured to hold items of differing sizes and shapes, comprising:
   an elongate support post having a first end and a second end;

a clamp member attached to the first end of the support post and configured to removably secure the support post relative to a surface;

a support member supported by the second end of the support post, the support member being rotatable about a longitudinal axis of the support post;

a first holder depending from the support member and wholly supported thereby, the first holder having a base portion and at least two sidewalls that cooperate to releasably support a beverage container, the first holder being removably attached to the support member at a first position that is a distance from the first end along the axis; and a second holder depending from the support member and wholly supported thereby, the second holder having a base, a plurality of outer walls, and at least one divider wall, the walls and base configured so as to define a plurality of compartments sized and adapted to accommodate office supplies, and the second holder is removably attached to the support member at a second position that is generally the same distance from the first end along the axis as the first position;

wherein the first and second holders can be rotatively moved about the longitudinal axis of the support post and selectively removed from and replaced onto the support member.

3. The apparatus of claim 2 additionally comprising a third holder releasably connected to the support member and wholly supported thereby, the third holder having a third configuration that is different than the first and second holder configurations.

4. The apparatus of claim 2, wherein the base of the first holder comprises an upwardly extending lip about an edge of the base.

5. The apparatus of claim 4, wherein the base of the first holder has a raised portion positioned generally centrally in the base so that a beverage container placed in the first holder would rest at least partially upon the raised portion, the raised portion and lip configured so that a space is defined between the raised portion and the lip.

6. The apparatus of claim 2, wherein the second holder comprises a second base spaced from the base of the first holders, and a plurality of walls are joined to the second base so that the walls and base define at least one compartment.

* * * * *